(12) United States Patent
Boaventura-Delanoe

(10) Patent No.: US 9,831,753 B2
(45) Date of Patent: Nov. 28, 2017

(54) SWITCHED RELUCTANCE PERMANENT MAGNET MOTOR

(71) Applicant: Paul Boaventura-Delanoe, Los Angeles, CA (US)

(72) Inventor: Paul Boaventura-Delanoe, Los Angeles, CA (US)

( * ) Notice: Subject to any disclaimer, the term of this patent is extended or adjusted under 35 U.S.C. 154(b) by 31 days.

(21) Appl. No.: 15/099,567

(22) Filed: Apr. 14, 2016

(65) Prior Publication Data

US 2017/0302144 A1  Oct. 19, 2017

(51) Int. Cl.
| | |
|---|---|
| *H02K 21/24* | (2006.01) |
| *H02K 19/10* | (2006.01) |
| *H02K 1/17* | (2006.01) |
| *H02K 1/16* | (2006.01) |
| *H02K 1/24* | (2006.01) |
| *H02K 3/12* | (2006.01) |

(52) U.S. Cl.
CPC ............ *H02K 19/103* (2013.01); *H02K 1/16* (2013.01); *H02K 1/17* (2013.01); *H02K 1/246* (2013.01); *H02K 3/12* (2013.01); *H02K 21/24* (2013.01)

(58) Field of Classification Search
CPC ............ H02K 47/18; H02K 1/14; H02K 1/24; H02K 1/246; H02K 1/27; H02K 3/18; H02K 19/108; H02K 19/20; H02K 53/00; H02K 19/103; H02K 3/12; H02K 1/17; H02K 1/16; H02K 21/24
See application file for complete search history.

(56) References Cited

U.S. PATENT DOCUMENTS

| | | | | |
|---|---|---|---|---|
| 4,608,505 A | * | 8/1986 | Schumacher | .......... H02K 31/02 310/208 |
| 4,757,224 A | * | 7/1988 | McGee | .................. H02K 21/44 310/111 |
| 6,359,358 B1 | * | 3/2002 | Bae | ......................... B60L 11/18 310/113 |
| 7,663,283 B2 | * | 2/2010 | Holtzapple | ............... F01C 1/10 310/168 |
| 9,006,948 B2 | * | 4/2015 | Ahn | ........................ H02K 7/09 310/166 |
| 9,467,009 B2 | * | 10/2016 | Vanderelli | ................ H02K 1/08 |

* cited by examiner

*Primary Examiner* — Michael Zarroli

(57) ABSTRACT

The invention provides a switched reluctance motor having high torque and reduced counter electromotive force for generating mechanical energy. The motor includes a rotor component having a plurality of rotor poles speed equally circumferentially around the center of the rotor component, a stator component positioned around the rotor component and having a plurality of bifurcated stator poles and coil windings to in the separation between the legs of each stator pole, and a magnet mounted between adjacent stator poles, a shunt in electromagnetic communication with the coil windings the stator poles, and a bridge component encircled by the coil windings and separating each stator pole from each shunt.

3 Claims, 2 Drawing Sheets

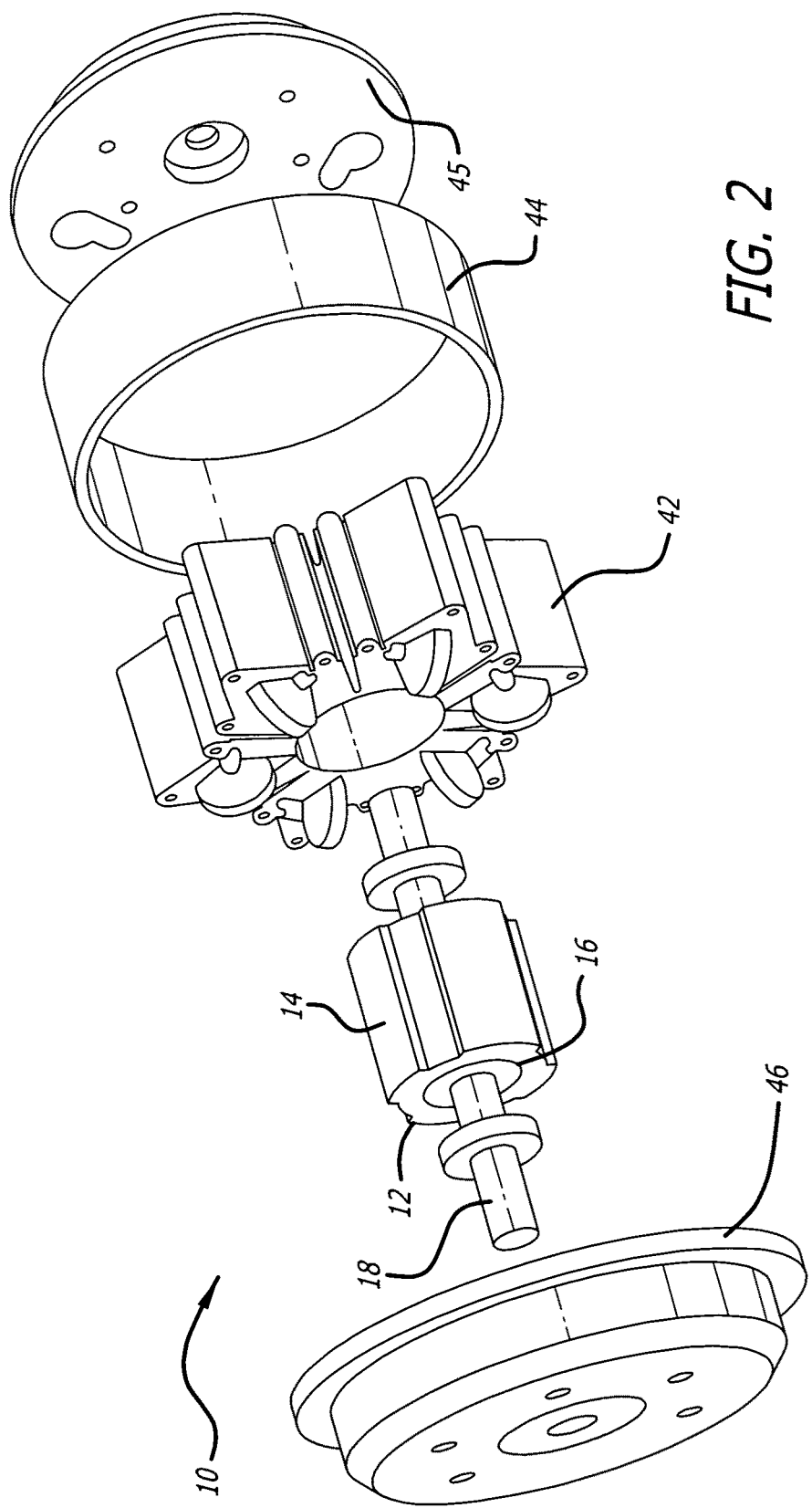

SWITCHED RELUCTANCE PERMANENT MAGNET MOTOR

FIELD OF THE INVENTION

The present disclosure is directed to a high torque switched reluctance electric motor.

BACKGROUND OF THE INVENTION

Typically, a motor takes power in the form of voltage and current. This power is converted over time into mechanical energy, for example in the form of rotation of a shaft attached to the motor to operate another device, such as a generator. Switched reluctance motors are well-known in the art. One type of reluctance motor is controlled by circuitry that determines the position of the rotor, and coil windings on the stator poles are energized as a function of rotor position. This type of reluctance motor is generally referred to as a "switched reluctance motor" or "SRM." Rotors are typically constructed of low reluctance materials such as iron and its alloys, nickel, cobalt, etc., that tend to strongly align to an incident magnetic field. Thus, a typical SRM has a rotor with alternating regions of high and low reluctance on it, and a stator with electromagnets, that when energized in sequence, will pull the low reluctance regions, or poles of the rotor, to turn the rotor and produce power.

The number of stator poles and the number of rotor poles in a SRM may be varied resulting in many different geometries. A common geometry is a 3 phase, 4 rotor, 6 stator configuration as depicted in FIG. 1, with the rotor concentric to the stator and rotably positioned relative to the stator. The stator and rotor consist of salient (projecting) poles, with wire coils wound around a portion of each stator. The field coils receive electricity from an outside source. A shaft is typically positioned centrally of the stator and rotor, coupled to the center of the rotor, to transfer the driving force of the motor to mechanical energy, for example, another device.

When current is supplied to coil windings in a motor in a magnetic field, the magnetic force produces a torque which causes the rotor to turn relative to the stator, or the stator to turn relative to the rotor, producing magnetic flux changes. An electromotive force (EMF), consistent with Faraday's law of induction, is induced in the coil windings, moving the rotor poles towards the stator poles, so as to minimize resistance. The induced EMF opposes any change, so that the input EMF that powers the motor will be opposed by the motor's self-generated EMF, called the "back" or "counter" EMF (CEMF) of the motor. The presence of CEMF will result in lower efficiency and a need for increased voltage across the coils to overcome the CEMF. If the rotor or stator is rotating slowly, the CEMF is relatively low, and a large current flows through the motor, providing a high torque. As the speed of rotation of the motor increases, the CEMF increases, reducing the current through the motor. The CEMF determines the speed of the motor for a particular voltage, such that the speed of motors is controlled by varying the supplied voltage. More torque loading will result in less speed and more current. As the load on the motor increases, the motor will slow, reducing the CEMF and permitting a larger current to flow in the coils. Because torque is proportional to current, an increase in torque results from an increase in load on the motor. By reducing CEMF, a motor can operate at significantly increased efficiencies. A motor control circuit controls the speed and torque of the motor.

Variations of a switched reluctance motor are known, for example, where permanent magnets are located between adjacent stators of a conventional switched reluctance motor. Certain of these variations are referred to as "hybrid switched reluctance motors."

There remains a need for high torque motors that can operate at increased efficiencies to operate devices, such as DC and AC electricity generators or mechanical equipment.

SUMMARY OF THE INVENTION

Accordingly, the present invention provides a switched reluctance motor that provides high efficiency production of mechanical energy in part by reducing counter EMF.

The switched reluctance electric motor includes a rotor component having a plurality of rotor poles spaced equally circumferentially around the center of the rotor component, a stator component positioned around the rotor component and having a plurality of bifurcated stator poles having legs separated by space and having coil windings located in the separation between the legs of each stator pole, and a magnet mounted between the legs of adjacent stator poles, a shunt in electromagnetic communication with the coil windings and the stator poles, and a bridge component encircled by the coil windings and separating each stator pole from each shunt. The rotor of the motor may have four poles and the stator component may have six stator poles, six bridge components and six shunts.

The method provides mechanical energy by providing electrical current to the coil windings of a motor to rotate a rotor component, the motor including a rotor component having a plurality of rotor poles spaced equally circumferentially around the center of the rotor component, a stator component positioned around the rotor component and having a plurality of bifurcated stator poles having spaced legs and coil windings located in the separation between the legs of each stator pole, and a magnet mounted between the legs of adjacent stator poles, and a shunt in electromagnetic communication with the coil windings and the stator poles, a bridge component encircled by the coil windings and separating each stator pole from each shunt, and a shaft in contact with the rotor component, wherein the shaft rotates when the rotor component rotates providing mechanical energy.

Additional features, advantages, and aspects of the present disclosure are set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate aspects of the present disclosure and, together with the detailed description, serve to explain the principles of the present disclosure. No attempt is made to show structural details of the present disclosure in more detail than may be necessary for a fundamental understanding of the present disclosure and the various ways in which it may be practiced. In the drawings:

FIG. 2 shows the switched reluctance motor in a housing in an embodiment of the invention.

DETAILED DESCRIPTION OF THE INVENTION

Figure 1:
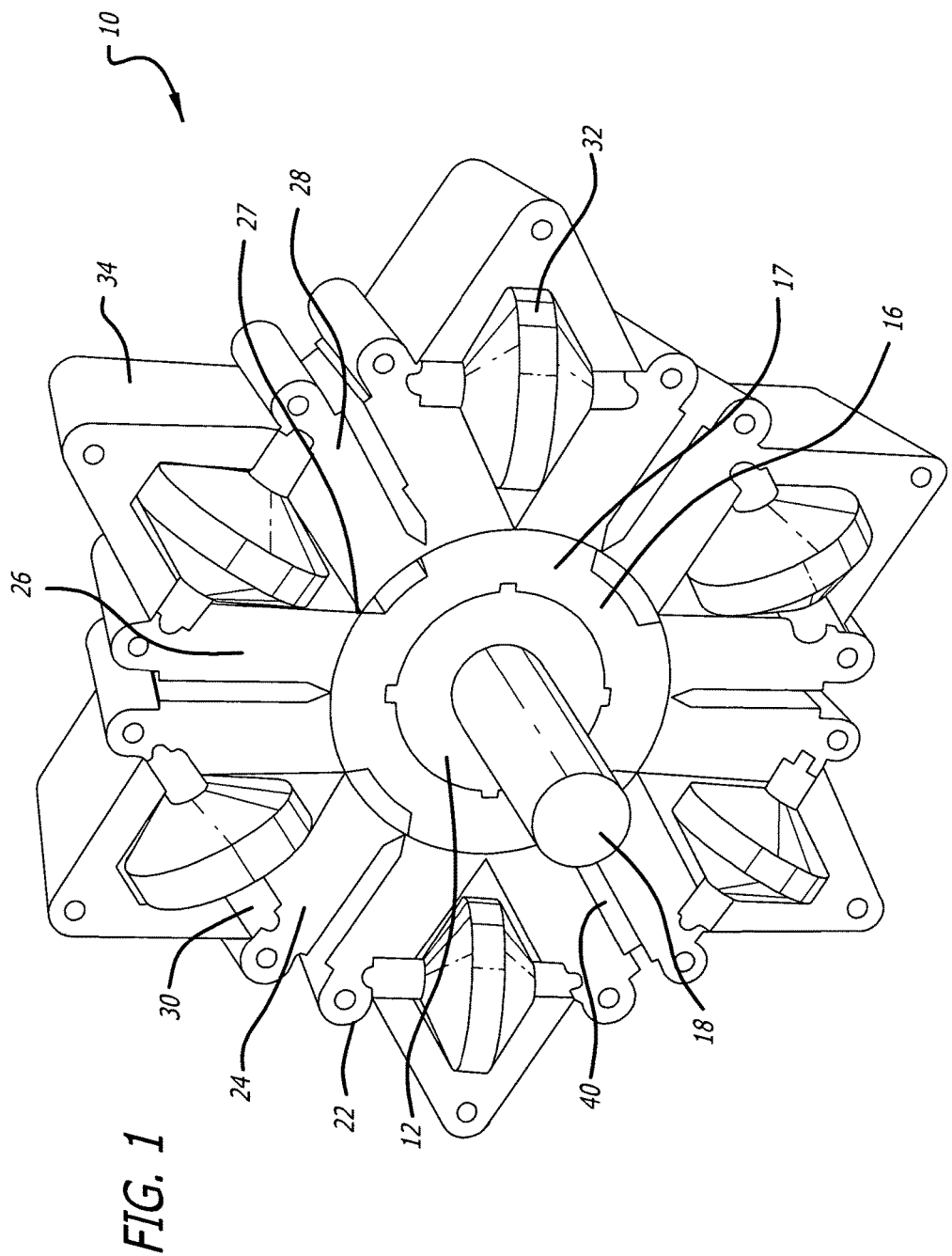
FIG. 1 illustrates an embodiment of the switched reluctance motor of the invention.

The aspects of the present disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the present disclosure. The examples used herein are intended merely to facilitate an understanding of ways in which the present disclosure may be practiced and to further enable those of skill in the art to practice the aspects of the present disclosure. Accordingly, the examples and aspects herein should not be construed as limiting the scope of the present disclosure, which is defined solely by the appended claims and applicable law. Moreover, it is noted that like reference numerals represent similar parts throughout the drawings.

According to the present disclosure, referring to FIG. 1, an embodiment of the motor 10 of the invention includes a rotor 12 that may have four (4) salient rotor poles 14 (FIG. 2) positioned equally spaced circumferentially around rotor component 12, which may have a timing disc 16, and may have shaft 18, inserted into a central opening 20 of the rotor 12, the shaft 18 rotating when the rotor component 12 rotates. The motor 10 further includes a stator component 22 that may have six (6) adjacent, bifurcated salient stator poles 24, each stator pole 24 having a first leg 26 and a second leg 28. Point 27 between stator pole legs 26 and 28 is the point where the beginning of a rotor pole 14 contacts the stator component 22 and electrical power is sent to the coil. The salient stator poles 24 are not in contact at their bases with the rotor component 12. In an embodiment, rotor poles 14 cover 60 degrees of the 360 degree arc of the rotor component 12. The motor 10 may include other numbers of rotor poles 14 and stator poles 24, for example eight rotor poles 14 and twelve stator poles 24, or twelve rotor poles 14 and 18 stator poles 24. The rotor component 12, stator component 22 may be formed of metal such as steel, for example electrosteel, lamination steel or other suitable material, for example as multiple layers or thin "lamination stacks."

As also shown in FIG. 1, each pair of bifurcated stator poles 24 has a bridge 30, that connects the legs 26 and 28 of each stator pole 24 and supports the coil windings 32. The bridges 30 serve to redirect the magnet flux across the stator poles 24 and reduce the CEMF. Coil windings 32 may be wound around and encircle each bridge 30. Optimally, each coil consists of multiple turns of wire. Coil windings 32 may be made of copper or other conducting metal such as aluminum. Each bifurcated stator pole 24 further has a shunt 34. In an embodiment illustrated in FIG. 1, the shunt 34 has a first leg 36 and a second leg 38, the first 36 and second 38 legs separated by a gap from the bridge 30. A non-conducting shim (not shown) may be inserted between the bridge 30 and each shunt leg 36 and 38 of each stator pole 24. The shunt 34 can be other shapes such as a square, rectangle or round. Permanent magnets 40 are positioned between the legs 26 and 28 of adjacent stator poles 24 and serve to direct the magnet flux between the magnets 40. The stator 22, bridges 30, coils 32 and shunt 34 are collectively referred to as the stator assembly 42.

As shown in FIG. 2, the rotor 12 and stator assembly 42 may be assembled and placed in housing 44 with bell caps 45 and 46 comprising motor 10. Shaft 18 may be connected to any device (not shown) that requires application of mechanical energy, such as a generator. A timing disc 16 may be used to set the timing of power supply to the coil windings 32. The timing disc 16 turns on the power to the coil windings 32 when timing disc poles 17 align with the rotor poles 14 and point 27 between the legs of the stator poles 24, turning the power off before a leg 26, 28 of a stator pole 24 comes into alignment with a rotor pole 14. The fluxes resulting from alternation switching the current to the coil winding 32 on and off results in turning of the rotor 12 and turning of the shaft 18, transferring mechanical energy.

When electrical current is provided to coil windings 32 a magnetic flux is created causing the rotor 12 to rotate within stator assembly 42 a selected distance across the stator poles, generating a magnet flux from magnets 40 which is combined with the coil magnetic flux to create greater torque. When energized with an opposing polarity, the magnetic field is forced into the rotor 12 to create maximum torque. In a four rotor pole 14, six stator pole 24 motor, when one pair of opposite rotor poles 14 has moved into alignment with the point 27 between both legs 26 and 28 of a stator pole 24, the other pair of opposite rotor poles 14 is in alignment with the second leg 28 of one stator pole 24 and the first leg 26 of the adjacent stator pole 24 for the next torque cycle. When there is no electrical current provided to the coils 32, the magnetic field flows around the perimeter of the stator assembly 42 and a negligible amount into the rotor 12.

The use of shunts 34 causes the coil windings 32 to become maximally saturated which prevents large changes in the magnetic field inside the coil windings 32, reducing the amount of CEMF and, in turn, reducing the amount of electrical power needed to operate the motor. Additionally, the permanent magnets are used to redirect the magnetic field to the next permanent magnet in rotation through the bridge 30 where it is combined with the magnet flux and coil flux in the next stator pole 24. Because the shunts 34, stators 22 and bridges 30 are fully saturated, this results in improvement in power conversion efficiency (electrical to mechanical gain) and reduced CEMF. In addition, electrical current can be recycled from flux relaxation in the coils resulting in further power gain factors (coefficients of performance). Excess electrical energy is drawn from the shunts 34 and may be stored for example in capacitors or batteries, or chokes or used to power other devices.

Thus, switched reluctance motor 10 reduces CEMF to negligible levels while maintaining high torque under constant or changing loads. Parameters of performance of motor 10 may be adjusted, for example, a motor 10 having a desired horsepower is produced by adjusting the dimensions of the of the rotor and stator laminations, the number of coil windings and/or the dimensions of the shunt.

While the present disclosure has been described in terms of exemplary aspects, those skilled in the art will recognize that the present disclosure can be practiced with modifications in the spirit and scope of the appended claims. These examples and embodiments given above are merely illustrative and are not meant to be an exhaustive list of all possible designs, aspects, applications or modifications of the present disclosure. The number of rotor poles and/or stator poles of the motor may be varied, as well as the number of windings of the field coils around the shunts.

What is claimed is:

1. A switched reluctance electric motor having high torque and reduced counter electromotive force, comprising:
   a rotor component having a plurality of rotor poles spaced equally circumferentially around the center of the rotor component;
   a stator component positioned around the rotor component and having a plurality of bifurcated stator poles having legs separated by space and having coil windings located in the separation between the legs of each stator pole, and a magnet mounted between the legs of adjacent stator poles;
   a shunt in electromagnetic communication with the coil windings and the stator poles; and
   a bridge component encircled by the coil windings and separating each stator pole from each shunt.

2. The motor of claim 1, wherein the rotor has four poles and the stator component has six stator poles, six bridge components and six shunts.

3. A method of providing mechanical energy comprising:
   providing electrical current to the coil windings of a motor to rotate a rotor component, the motor comprising:
   a rotor component having a plurality of rotor poles spaced equally circumferentially around the center of the rotor component;
   a stator component positioned around the rotor component and having a plurality of bifurcated stator poles having spaced legs and coil windings located in the separation between the legs of each stator pole, and a magnet mounted between the legs of adjacent stator poles; and
   a shunt in electromagnetic communication with the coil windings and the stator poles;
   a bridge component encircled by the coil windings and separating each stator pole from each shunt; and
   a shaft in contact with the center of the rotor component, wherein the shaft rotates when the rotor component rotates providing mechanical energy.

* * * * *